United States Patent
Sin

(10) Patent No.: US 9,864,358 B2
(45) Date of Patent: Jan. 9, 2018

(54) EVENT INPUT MODULE

(71) Applicant: LSIS CO., LTD., Anyang-si, Gyeonggi-do (KR)

(72) Inventor: Yong Gak Sin, Anyang-si (KR)

(73) Assignee: LSIS CO., LTD., Seoul (KR)

( * ) Notice: Subject to any disclaimer, the term of this patent is extended or adjusted under 35 U.S.C. 154(b) by 595 days.

(21) Appl. No.: 14/498,611

(22) Filed: Sep. 26, 2014

(65) Prior Publication Data

US 2015/0105868 A1   Apr. 16, 2015

(30) Foreign Application Priority Data

Oct. 15, 2013  (KR) .................. 10-2013-0122924

(51) Int. Cl.
  *G05B 15/00* (2006.01)
  *G05B 19/05* (2006.01)
  *G06F 1/14* (2006.01)

(52) U.S. Cl.
  CPC ........... *G05B 19/052* (2013.01); *G05B 19/05* (2013.01); *G06F 1/14* (2013.01); *G05B 2219/13063* (2013.01)

(58) Field of Classification Search
  None
  See application file for complete search history.

(56) References Cited

U.S. PATENT DOCUMENTS

| | | | | |
|---|---|---|---|---|
| 6,859,742 B2 * | 2/2005 | Randall | .................. | G01R 22/00 324/74 |
| 7,447,931 B1 | 11/2008 | Rischar et al. | | |
| 8,965,592 B2 * | 2/2015 | Manson | ..................... | H02J 3/14 700/27 |
| 9,128,130 B2 * | 9/2015 | Seeley | ............... | G01R 19/2513 |
| 9,270,442 B2 * | 2/2016 | Rice | ....................... | H04L 7/0041 |
| 2007/0280299 A1 * | 12/2007 | Latremouille | ........ | H04J 3/0685 370/503 |
| 2011/0066301 A1 | 3/2011 | Donolo | | |
| 2012/0030495 A1 | 2/2012 | Chandhoke et al. | | |
| 2014/0321295 A1 * | 10/2014 | Fella, Jr. | ............... | H04L 41/069 370/252 |

FOREIGN PATENT DOCUMENTS

| | | |
|---|---|---|
| CN | 201556976 | 8/2010 |
| CN | 202872805 | 4/2013 |
| JP | 64-078172 | 3/1989 |
| JP | 02-195717 | 8/1990 |
| JP | 2000-132423 | 5/2000 |
| JP | 2006-276958 | 10/2006 |

(Continued)

OTHER PUBLICATIONS

Korean Intellectual Property Office Application Serial No. 10-2013-0122924, Office Action dated Sep. 30, 2014, 3 pages.

(Continued)

*Primary Examiner* — Evral E Bodden

(74) *Attorney, Agent, or Firm* — Lee, Hong, Degerman, Kang & Waimey

(57) ABSTRACT

Disclosed is an event input module, wherein the event input module receives time information which is an IRIG-B signal of a predetermined method from an outside time provider, allocates the time information to a detected event and determines event generation information.

5 Claims, 3 Drawing Sheets

(56) References Cited

FOREIGN PATENT DOCUMENTS

| | | |
|---|---|---|
| JP | 2008-205965 | 9/2008 |
| JP | 2013-149256 | 8/2013 |
| KR | 10-2009-0089097 | 8/2009 |
| KR | 10-2012-0046956 | 5/2012 |

OTHER PUBLICATIONS

European Patent Office Application Serial No. 14187851.2, Search Report dated Feb. 24, 2015, 6 pages.
The State Intellectual Property Office of the People's Republic of China Application Serial No. 201410545746.0, Office Action dated Nov. 4, 2016, 6 pages.
Japan Patent Office Application Serial No. 2014-209945, Office Action dated Sep. 29, 2015, 4 pages.

* cited by examiner

EVENT INPUT MODULE

CROSS-REFERENCE TO RELATED APPLICATION

Pursuant to 35 U.S.C. §119(a), this application claims the benefit of earlier filing date and right of priority to Korean Patent Application No. 10-2013-0122924, filed on Oct. 15, 2013, the contents of which are hereby incorporated by reference herein in its entirety.

BACKGROUND OF THE DISCLOSURE

1. Field of the Disclosure

Exemplary embodiments of the present disclosure generally relate to an event input module, and more particularly to an event input module configured to be used for time synchronization among PLCs (Programmable Logic Controllers).

2. Discussion of the Related Art

Integration, automation and remote control monitoring to minimize human intervention have been lately promoted in power transmission and distribution fields, which have become enabled by replacement of conventional electric devices with communication function-equipped, microprocessor-based intellectual electronic devices.

Many electric devices inside substations require time synchronization for accurate and effective information transfer, for which a variety of methods are being used for time synchronization of devices applicable to substation automation systems that include GPS (Global Positioning System), NTP (Network Time Protocol), SNTP (Simple Network Time Protocol), IRIG (Inter-Range Instrumentation Group)-B, and IEEE (Institute of Electrical and Electronics Engineers) 1588. One of the most generalized methods, among the abovementioned methods, is to perform synchronization with outside standard time using the GPS, the method of which however has a disadvantage in that a GPS module must be mounted, and expandability is limited to incur lots of costs.

Furthermore, the methods such as NTP and SNTP for realizing software time synchronization cannot perform the time synchronization if a difference between a current time and a time to be synchronized is too great, and even if the synchronization is performed, accuracy disadvantageously deteriorates to make them difficult to be applied to merging units of power system.

Meanwhile, the event input module, which is based on DC input module widely used in the PLC, is a data recording device functioning to collect input event information (time and state) in a predetermined resolution through a record relative to outside event. The event input module basically detects an event when an outside input is changed from ON to OFF and when the outside input is changed from OFF to ON, and stores a relevant time in internal memory. The event information is stored in order of being generated, which plays an important role in such fields as power generation, power transmission, power distribution and process plant.

FIG. 1 is a block diagram illustrating synchronization of PLC systems according to prior art.

A GPS (Global Positioning System) receiver (200) in the conventional PLC system receives a time data from a satellite (100) and outputs the data in a NMEA-0183 message. A signal outputted in an RS232 format goes through a converter (300) configured to convert to an RS485 signal for time synchronization between two PLC systems (400, 500). The RS485 signal is capable of multidrop, such that the signal is transmitted to PLC CPU (Central Processing Unit, 410, 510) modules of two systems through RS485 communication modules (420, 520) mounted on the two systems.

Each PLC CPU (410, 510) maintains the time data transmitted from the GPS receiver (200), and event input modules (430, 530) of each system store a relevant time in memories of the event input modules (430, 530) the moment an event input generated from a sensor output unit (700) is detected. A user checks the event data by connecting to the PLC CPU (410, 510) of PLC systems (400, 500) through an application terminal (600).

The GPS receiver (200) can output time by way of a variety of types and requires an interface of serial type for connection with the PLC systems (400, 500). Conventionally, an NMEA (National Marine Electronics Association)-0183 was used, and NMEA-0183 defines electrical transmission standards of RS-232, RS-422.

Event detection condition of event input modules (430, 530) is when a signal of the sensor output unit (700) is changed from low to high or from high to low. When a set event condition is detected, an LED (Light Emitting Diode) of the event input modules (430, 530) is displayed with an event state. The two PLC systems (400, 500) require time synchronization in the system configured as in FIG. 1.

FIG. 2 is a block diagram modeling a time delay of FIG. 1.

Referring to FIG. 2, $\Delta t1$ defines a transmission delay from the GPS receiver (200) to an RS232-RS485 converter (300). $\Delta t2$ and $\Delta t2'$ define a transmission delay from the converter (300) the communication modules (420, 520) and $\Delta t3$ and $\Delta t3'$ define a process delay of data processed by the communication modules (420, 520). $\Delta t4$ and $\Delta t4'$ define a transmission delay from the communication modules (420, 520) to the CPU modules (410, 510), and $\Delta t5$ and $\Delta t5'$ define a process delay of data processed by the CPU modules (410, 510). $\Delta t6$ and $\Delta t6'$ define a transmission delay from the CPU modules (410, 510) to the event input modules (430, 530), $\Delta t7$ and $\Delta t7'$ define a process delay of signal processed by the event input modules (430, 530). Furthermore, $\Delta t8$ and $\Delta t8'$ are a transmission delay from the sensor output unit (700) to the event input modules (430, 530).

A total time delay at the systems (400, 500) illustrated in FIG. 1 may be expressed by the following Equations 1 and 2.

$$\sum_{i=1}^{8} \Delta ti \quad \text{[Equation 1]}$$

$$\sum_{i=1}^{8} \Delta ti' \quad \text{[Equation 2]}$$

A user expects that delay elements of two systems (400, 500) are shown with a same value for time synchronization of two systems (400, 500). However, the delay elements of two systems cannot become identical to have a predetermined error, which is generally determined by a standard of a product for time synchronization.

A major delay element that generates a time synchronization error between two systems in the convention configuration is from $\Delta t3(\Delta t3')$ to $\Delta t5(\Delta t5')$, and it is due to the fact that the time information coming through the GPS receiver (200) is inevitably under the influence of the delay element generated from the communication modules (420, 520) and a scan period of PLC program performed by the CPU modules. This error is such that the time synchronization develops an important application as mutually different times are recorded when an event generated through the sensor output unit (700) is detected by the event input modules.

SUMMARY OF THE DISCLOSURE

The present disclosure is directed to cope with the above-mentioned problems/disadvantages and the present disclosure is to provide an event input module configured to provide an accurate time synchronization at mutually different PLC systems when an event generated from outside is to be recorded.

In a general aspect of the present disclosure, there is provided an event input module, the event input module of PLC (Programmable Logic Controller) comprising:
a first receiver configured to receive a signal from an outside sensor unit;
a second receiver configured to receive time information which is an IRIG (Inter-Range Instrumentation Group)-B signal from an outside time provider;
a controller configured to determine event generation information by allocating the time information received from the second receiver to an event detected through a signal received from the first receiver; and
a memory configured to store the event generation information.

Preferably, but not necessarily, the first receiver may include a first resistor configured to limit an input current and a second resistor configured to maintain an OFF guarantee voltage.

Preferably, but not necessarily, the IRIG-B signal may be an IRIG-B signal of RS-485 method.

Preferably, but not necessarily, the controller may receive the IRIG-B signal through a timer port (TMR).

Preferably, but not necessarily, the controller may interpret information of signal transmitted from the first receiver by detecting a pulse width of the IRIG-B signal inputted through the timer port.

Preferably, but not necessarily, the event input module may further comprise an interface unit configured to exchange the signal received from the controller with a CPU module of the PLC.

Preferably, but not necessarily, the interface unit may include a memory accessible by the CPU module and the controller.

Advantageous Effects of the Disclosure

The event input module according to the present disclosure has an advantageous effect in that a time delay element can be removed and a configuration cost of system can be reduced by receiving a time from outside of the PLC to provide an accurate time synchronization of mutually different PLC systems and simplifying a system configuration.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Hereinafter, exemplary embodiments of the present invention will be described in detail with reference to the accompanying drawings.

Figure 3:
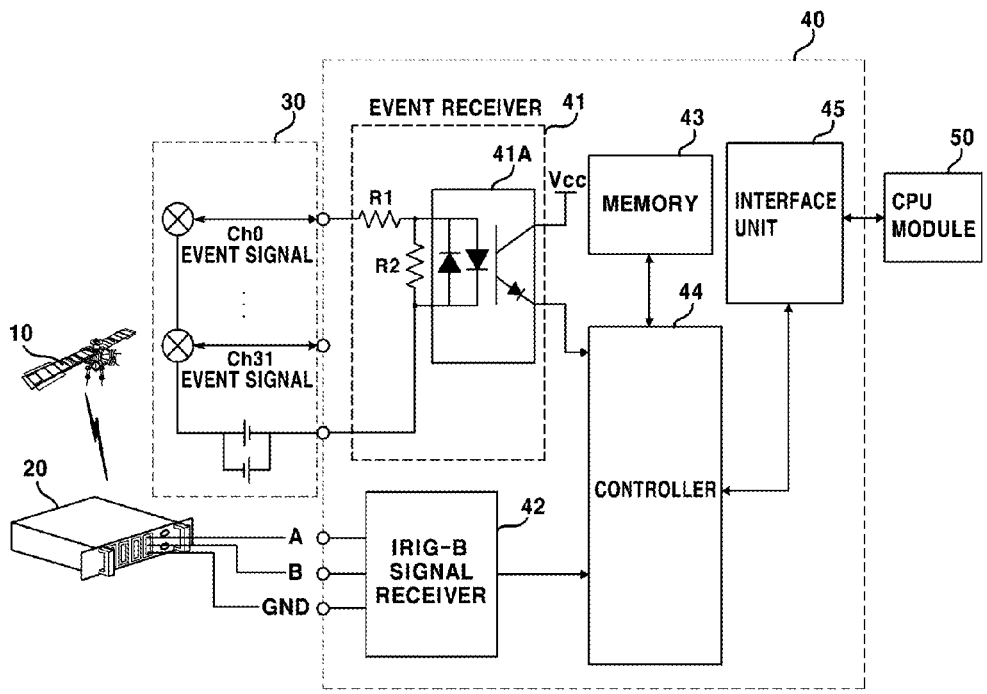
FIG. 3 is an exemplary view illustrating configuration of an event input module according to an exemplary embodiment of the present disclosure.

FIG. 3 is an exemplary view illustrating configuration of an event input module (40) according to an exemplary embodiment of the present disclosure, where the event input module (40) may receive a signal inputted from an outside sensor unit (30) and transmit the signal to a CPU module (50).

Referring to FIG. 3, the event input module (40) may include an event receiver (41), an IRIG (Inter-Range Instrumentation Group)-B signal receiver (42), a memory (43), a controller (44) and an interface unit (45).

The event receiver (41), which detects an event by receiving a signal outputted from the outside sensor unit (30), may include a resistor (R1) configured to limit an input current, a retaining resistor configured to retain an OFF guarantee voltage (R2) and a photo-coupler (41A). The event receiver (41) operates by receiving a 24V-voltage signal from the outside sensor unit (30). The outside sensor unit (30) is an NPN or PNP sensor configured to sense generation of event, the detailed structure of which will be omitted as it is well known to the skilled in the art.

The IRIG-B signal receiver (42) receives an IRIG-B signal from a time provider (20) in an RS-485 method, where the RS-485 method is selected because a time transmission is characteristically enabled from one time synchronization facility to a plurality of event input modules. An IRIG-B time synchronization protocol is one of IRIG standards, and one of the most widely used time synchronization methods as well. Thus, IRIG-B time synchronization protocol is well known to the skilled in the art and detailed explanation thereto will be omitted herefrom. The time provider (20) may be a GPS receiver, for example.

The memory (43) stored an event generation time, and the memory (43) may be configured with a non-volatile memory so that an already-generated event time can be maintained, even if a power is turned off.

The controller (44) takes charge of controlling the event input module (40) and receives, at a time port (TMR), a signal from the IRIG-B signal receiver (42). The IRIG-B signal generates 100 pulses at each second, and transmits in the order of second information, minute information, time information, day information and year information. At this time, one pulse has a 10 ms period, and the controller (44) can determine a duration in which period of each signal and high state are maintained, by receiving the signal at the time port of the controller (44).

The interface unit (45) takes charge of interface between the event input module (40) and CPU module (50), and allows data to be exchanged between the two systems using a predetermined method.

Now, operation of the event input module (40) according to the present disclosure will be described.

A 24V voltage signal received from outside sensor unit (30) may form a loop current by flowing through a current limit resistor (R1) of an even receiver (41). The OFF retaining resistor (R2) of the event receiver (41) prevents the photo-coupler (41A) from operating when a voltage that fails to reach a level for OFF guarantee at the outside sensor unit (30). To with, the R2 can maintain the OFF guarantee voltage.

Subsequently, an input signal is transmitted to an input port of the controller (44), whereby the controller (44) can detect generation of an event. Meanwhile, the time information inputted from the outside time provider (20) in an IRIG-B format is transmitted to the controller (44) through the IRIG-B signal receiver (42).

At this time, the time information can be received through the time port (TMR) of the controller (44) to interpret the transmitted information by detecting a pulse width of the IRIG-B signal. The information is received on a second unit, and then, the event input module (40) prepares to provide time information at all time so that even a millisecond value can be determined by using a timer setting of the controller (44).

In addition, the moment an event generated by the outside sensor unit (30) is transmitted to the controller (44) through the event receiver (41), the controller (44) allocates the prepared time information to a relevant event, where the event data is transmitted to the memory (43), where the event data can be kept as event generation information.

The interface unit (45) exchanges data with the CPU module (50). For example, the interface unit (45) may be configured with a circuit such as an ASIC (Application Specific Integrated Circuit) including a CPU module (50) and a memory accessible by the controller (44).

Figure 1:
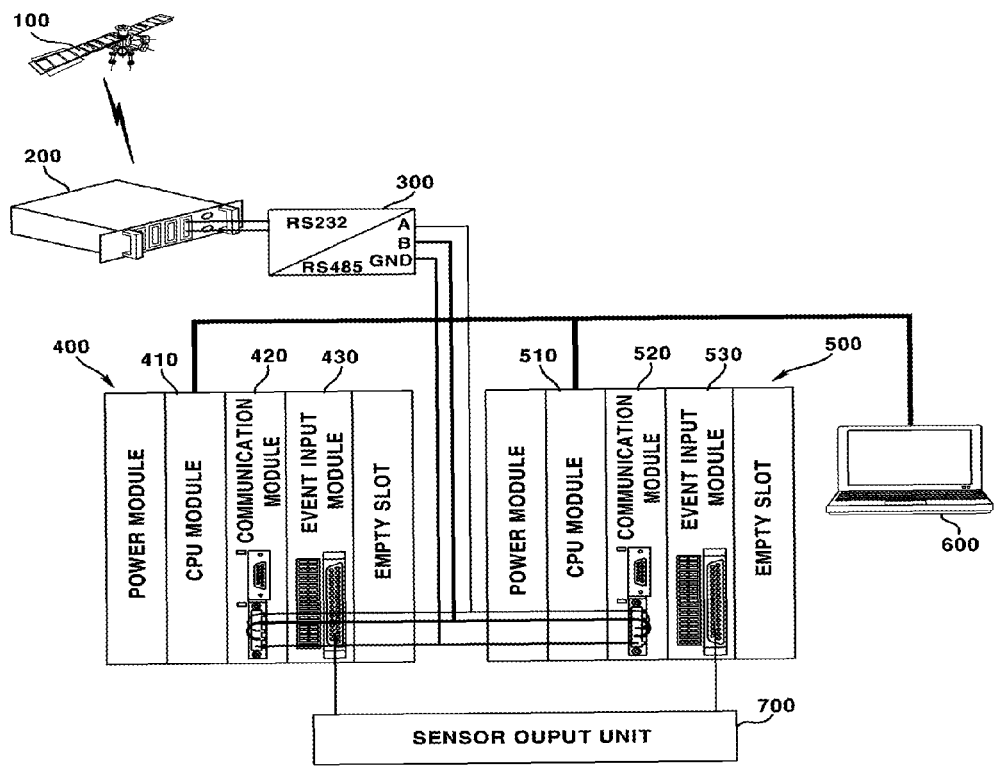
FIG. 1 is a block diagram illustrating synchronization of PLC systems according to prior art.
Figure 2:
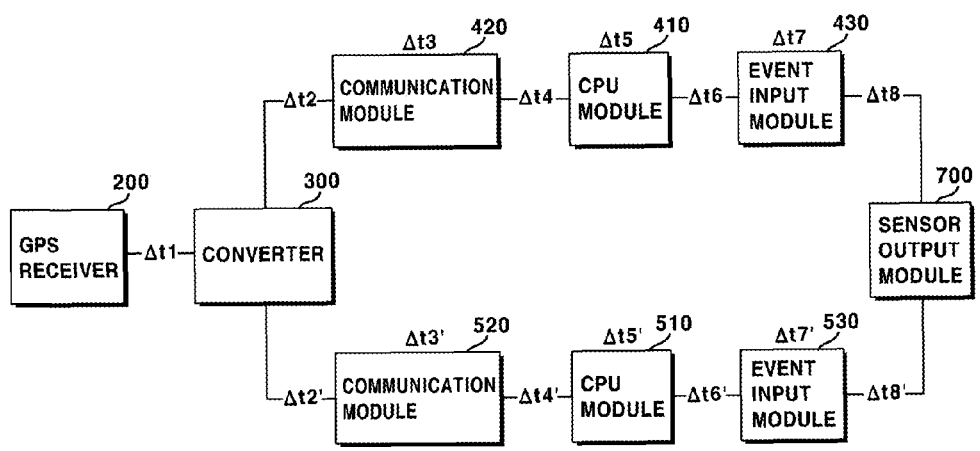
FIG. 2 is a block diagram modeling a time delay of FIG. 1.
Figure 4:
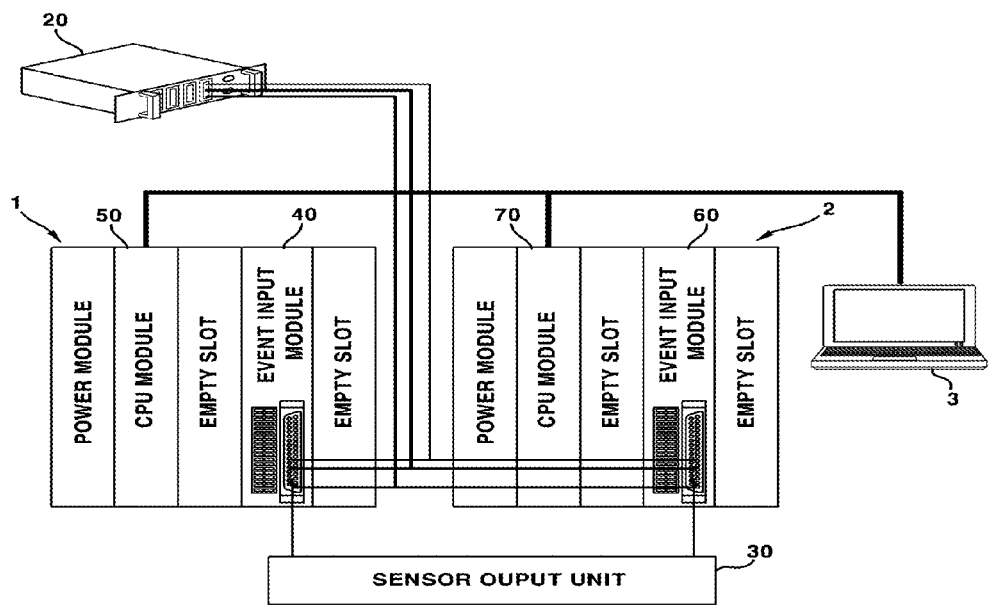
FIG. 4 is an exemplary view illustrating a time synchronization between two PLCs.
Figure 5:
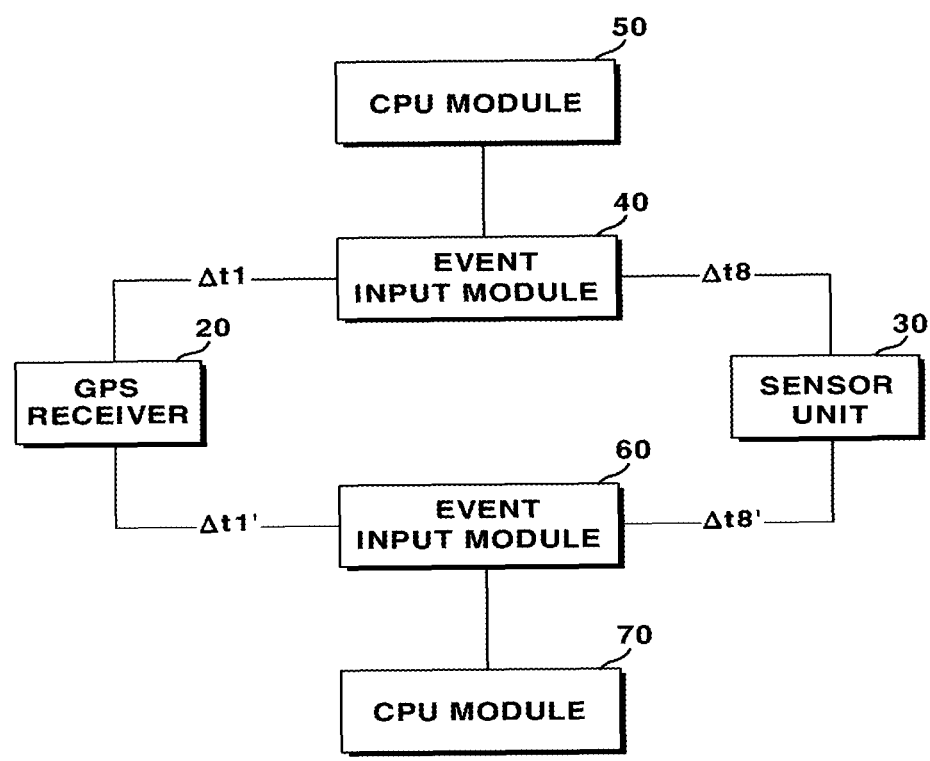
FIG. 5 is an exemplary view modeling a time delay of FIG. 4.

FIG. 4 is an exemplary view illustrating time synchronization between two PLCs, the principle of which is applied to the system of FIG. 1 according to prior art, and FIG. 5 is an exemplary view modeling a time delay of FIG. 4.

It can be noted from FIG. 4 that communication modules are removed from each PLC system over FIG. 1 according to the present disclosure whereby the system configuration is simplified.

Furthermore, it can be intuitively compared that the time delay elements from $\Delta t2$ to $\Delta t6$ are removed to thereby enable accurate time synchronization as illustrated in FIG. 5.

That is, the time delay elements at PLCs (1, 2) of FIG. 3 may be respectively expressed by the following Equations 3 and 4.

$$\Delta t = \Delta t1 + \Delta t7 + \Delta t8 \quad \text{[Equation 3]}$$

$$\Delta t' = \Delta t1' + \Delta t7' + \Delta t8' \quad \text{[Equation 4]}$$

In fact, the $\Delta t1(\Delta t1')$ and $\Delta t8(\Delta t8')$ which are time delay elements generated on a signal transmission path are at negligible levels, such that important time delay elements between two systems may be summarized as $\Delta t7$ and $\Delta t7'$.

Furthermore, because the two event input modules (40, 60) are systems using same hardware and firmware, it can be said that an error of time required for time interpretation can be also negligible levels.

It can be also noticed from FIG. 5 that time delay elements between the event input modules (40, 60) and the CPU modules (50, 70) are not shown, which means that time required for synchronization has been already determined by the event input modules (40, 60), and well indicates how the time delay elements at the CPU modules according to the conventional system prior art affect the present disclosure, whereby the present disclosure can provide an advanced time synchronization to the power system including power generation, power transmission and power distribution, and to the automatic systems applicable to process plants.

As apparent from the foregoing, the present disclosure provides an event input module configured to implement an IRIG-B interface to solve time delay elements in the conventional PLC systems, through which a method enabling an accurate time synchronization can be provided. Furthermore, a system configuration for time synchronization between mutually different PLC systems can be simplified, whereby advantages can be obtained in terms of costs and spaces.

Most of the time delay elements are generated in the course of data processing rather than from the transmission path, and the present disclosure can fundamentally solve the delay elements that may be influenced by PLC user program, by removing the time delay elements at the CPU modules that take the lion's share of the time delay elements.

Although the event input module according to the present disclosure has been described with reference to a number of limited illustrative embodiments thereof, it should be understood that numerous other modifications and embodiments can be devised by those skilled in the art that will fall within the spirit and scope of the principles of this disclosure. Therefore, it should be understood that the above-described embodiments are not limited by any of the details of the foregoing description and drawings, unless otherwise specified, but rather should be construed broadly within the scope as defined in the appended claims

What is claimed is:

1. An event input module of a PLC (Programmable Logic Controller), the module comprising:
    a first receiver configured to receive a signal from an external sensor unit, the first receiver including a first resistor configured to limit an input current and a second resistor configured to maintain an OFF guarantee voltage;
    a second receiver configured to receive time information from an external time provider, the time Information is an IRIG (Inter-Range Instrumentation Group)-B signal of the RS-485 type;
    a controller configured to determine event generation information by allocating the received time information to an event detected via a signal received from the first receiver; and
    a memory configured to store the determined event generation information.

2. The event input module of claim 1, wherein the controller is further configured to receive the IRIG-B signal via a timer port (TMR).

3. The event input module of claim 2, wherein the controller is further configured to interpret information related to a signal transmitted from the first receiver by detecting a pulse width of the received IRIG-B signal.

4. The event input module of claim 1, further comprising an interface unit configured to exchange a signal received from the controller with a Central Processing Unit (CPU) module of a PLC.

5. The event input module of claim 4, wherein the interface unit includes a memory accessible by the CPU module and the controller.

\* \* \* \* \*